UNITED STATES PATENT OFFICE.

MURDOCH MACKAY, OF LONDON, ENGLAND, ASSIGNOR OF ONE-HALF TO RICHARD EDWARD GOOLDEN, OF SAME PLACE.

PLASTIC COMPOUND SUITABLE FOR MOLDING INTO VARIOUS USEFUL ARTICLES, SUCH AS SCREW-STOPPERS FOR BOTTLES, JARS, &c.

SPECIFICATION forming part of Letters Patent No. 310,899, dated January 20, 1885.

Application filed June 11, 1884. (No specimens.) Patented in England November 20, 1883, No 5,467; in France May 20, 1884, No. 162,249, and in Belgium May 23, 1884, No. 65,23°.

*To all whom it may concern:*

Be it known that I, MURDOCH MACKAY, a subject of the Queen of Great Britain, residing at London, England, have invented new and useful Improvements in Plastic Compounds Suitable for Molding into Various Useful Articles, such as Screw-Stoppers for Bottles, Jars, &c., Brushes, Buttons, or any other articles for useful or ornamental purposes which are required to stand a high degree of heat, (for which I have obtained a patent in Great Britain, No. 5,467, dated the 20th day of November, 1883,) of which the following is a specification.

This invention relates to the manufacture of improved plastic compounds or compositions suitable for molding into various articles, such as screw-stoppers for bottles, jars, casks, and similar vessels; for the manufacture of that class of brushes which have their bristles secured in plastic material; also, for buttons and for various other articles for useful and ornamental purposes which are required to stand a high degree of heat, whether dry, moist, or liquid.

The improved compositions are manufactured from a mixture of gum-sandarac or gum-kauri, (singly or in combination,) shellac, with or without rosin, carbon or asphaltum, and asbestus or other fibrous material or silicates.

In manufacturing a compound suitable for making screw-stoppers and other articles which require to be free from taste and smell, and which are likely to be subjected to a high degree of heat, I employ the following ingredients, in about the proportions specified—that is to say, about seventy-five pounds of lac, (preferably shellac,) thirty-eight pounds of gum-sandarac, thirty-eight pounds of ordinary rosin, thirty-eight pounds of ivory-black or other fine carbon, and one hundred and sixty-eight pounds of asbestus or other suitable fibrous material or silicates.

I first put the above-named resins and ordinary pine-rosin into a suitable vessel and heat the same until they are reduced to a fluid state. I then add the carbon, and when this has been well amalgamated I add the asbestus or other fibrous matters or silicates. The whole is well combined by stirring until it forms a stiff paste, which is then fit to be molded in dies (preferably heated) or to be rolled out into sheets; or the ingredients, when heated, can be mixed and worked into a paste by being passed through hot rollers. When the compounds are required of various colors, I omit the carbon and add in place thereof any suitable colored pigments.

The above proportions may be in some cases varied, according to the quality of the materials employed, it being borne in mind in proportion as the quantity of gum-sandarac used is increased the heat-resisting quality of the compound formed is increased; but it should not be used in excess, as the result would be to give unnecessary brittleness to the compound.

The above composition is not affected by either dry or moist heat at 200° Fahrenheit, nor in hot water at 210° Fahrenheit. It is not affected by the fermentation in beer, wine, and the like, and is free from taste or smell when in contact with such liquids, and is specially adapted for use in hot climates.

When the composition is not required to be entirely free from taste and smell, gum-kauri may be used in combination with gum-sandarac, by preference in equal proportions, though other proportions may be used; also, in some cases I employ asphaltum in place of or in combination with the carbon.

The ingredients of my improved compounds and the proportions thereof above named are those which I have found to answer well for producing compounds suitable for the purposes mentioned; but it will be evident that the proportions of the ingredients may be varied according to the nature of the articles to be manufactured therefrom. In some cases other resins may be employed in combination with gum-sandarac and gum-kauri.

Having now particularly described and ascertained the nature of my said invention and in what manner the same is to be performed, I declare that what I claim is—

The plastic compound described, consisting of lac, gum-sandarac, rosin, ivory-black, and asbestus, or their described equivalents, in the proportions substantially as set forth.

MURDOCH MACKAY.

Witnesses:
G. F. REDFERN,
F. PRICE.